Feb. 28, 1967 TOYOAKI BADA ET AL 3,307,014
ARC WELDING PROCESS
Filed Sept. 13, 1965 12 Sheets-Sheet 1

INVENTORS
Toyoaki BADA, Norio TANAKA and
Masaharu KABATA
BY
M. Glew and Toren
ATTORNEYS

RIGHT: FACE WELDBEAD
LEFT: ROOT WELDBEAD

Feb. 28, 1967  TOYOAKI BADA ETAL  3,307,014
ARC WELDING PROCESS
Filed Sept. 13, 1965  12 Sheets-Sheet 11

(a)

(b)

(c)

(d)

(e)

(f)

(a)

(b)

INVENTORS
TOYOAKI BADA, NORIO TANAKA
AND MASAHARU KABATA
BY
McGlew and Toren
ATTORNEYS (a)

(b)

(c)

(d)

(e)

United States Patent Office 3,307,014
Patented Feb. 28, 1967

3,307,014
ARC WELDING PROCESS
Toyoaki Bada, Tokyo, and Norio Tanaka and Masaharu Kabata, Kanagawa-ken, Japan, assignors to Fuji Iron and Steel Company Limited, Marunouchi, Chiyoda-ku, Tokyo, Japan
Filed Sept. 13, 1965, Ser. No. 486,925
Claims priority, application Japan, Sept. 14, 1964, 39/52,511; Apr. 14, 1965, 40/21,996; Aug. 3, 1965, 40/47,047
8 Claims. (Cl. 219—137)

This invention relates to an improved fully or semi-automatic welding process.

It is one of the main features of this invention that, in submerged arc welding, $CO_2$ arc welding and inert gas metal arc welding processes, one-pass and one-side butt welding or one-pass butt welding from both sides is performed on steel plates with I-shaped edges using a flux-cored wire.

An important advantage of the present invention is that no edge preparation is needed; edges as received or gas-cut can be used for this purpose. In the conventional automatic or semi-automatic welding processes, one-side welding cannot be performed successfully, and welding is generally performed from both sides using steel plates with an X, V or Y edge preparation, because a root weld bead is not satisfactory and a complete weld joint cannot be obtained by conventional processes.

For this reason, in the welding of thick plate by conventional processes, edge preparation, such as the formation of X, V and Y shaped edges was essential, and the number of set-ups for edge preparation has been considerably large.

For an understanding of the principles of the invention, reference is made to the following description of typical embodiments thereof as illustrated in the accompanying drawings.

In the drawings:

FIG. 4b is an end elevation view of another form of backing member;

Figure 11:
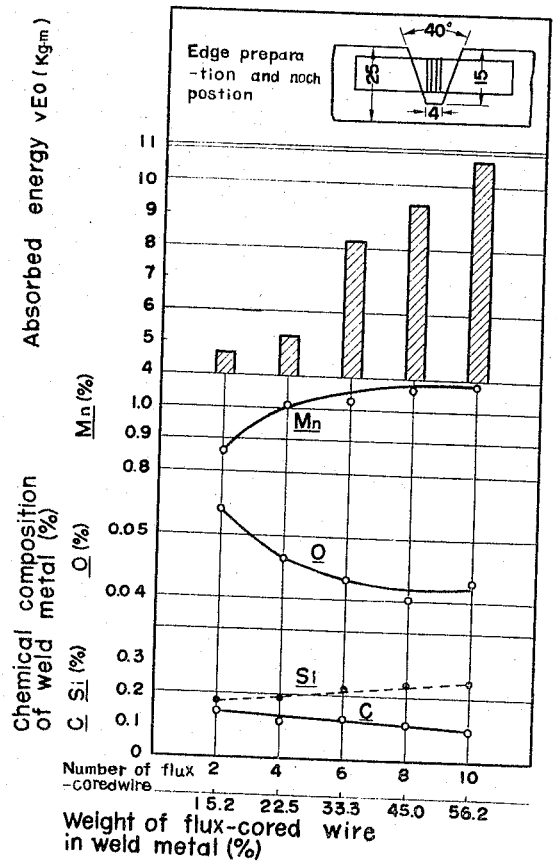

FIG. 11 graphically shows the influence of the number of flux-cored wires filled in the groove on the chemical composition and absorbed energy of welds by submerged arc welding in accordance with the present invention.

Figure 12:
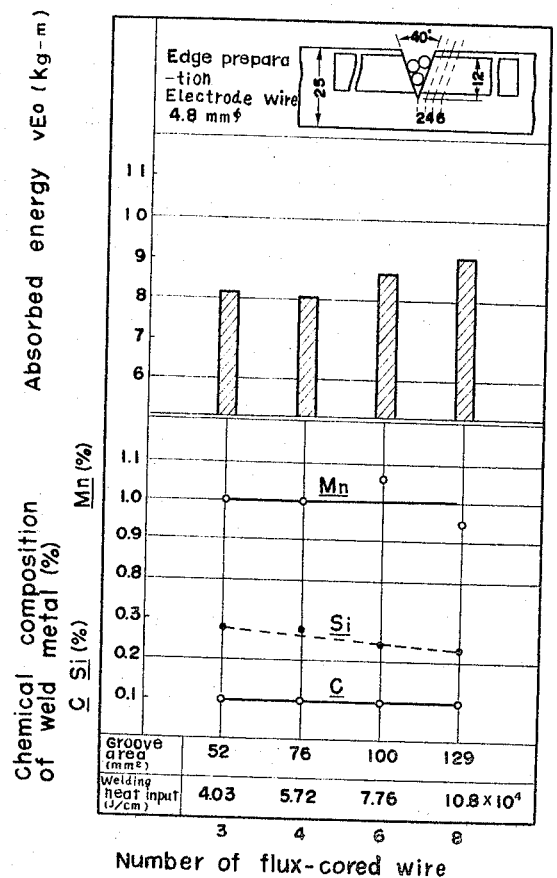

FIG. 12 graphically shows the effect of the groove area on the chemical composition and absorbed energy of welds made by submerged arc welding in accordance with the present invention.

Figure 13:
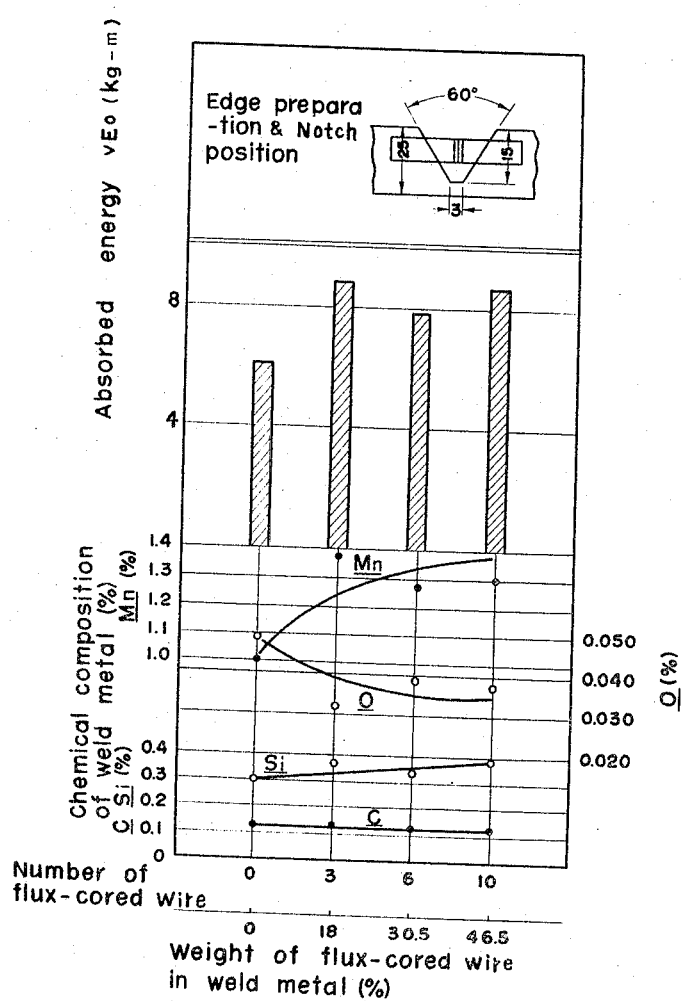

FIG. 13 graphically shows the effect of the number of flux-cored wires filled in the groove on the impact value and chemical composition of welds made by $CO_2$ arc welding in accordance with the present invention.

FIGS. 14a through 14f are end elevation views illustrating the edge preparations for the plates A, B, C, D, E and F, respectively, in Example 1 (Table 5).

FIGS. 15a and 15b are end elevation views illustrating, respectively, the edge preparations for the plates G and H in Example 1 (Table 6).

FIGS. 16a through 16e illustrate, respectively, the edge preparations for the plates I, J, K, L and M in Example 2 (Table 10).

Figure 1A:
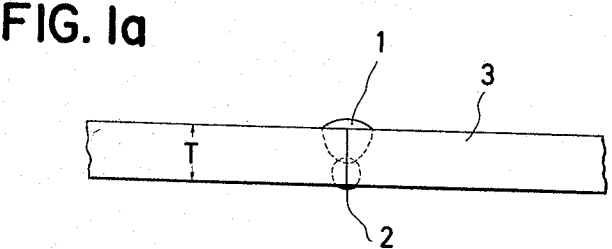
FIGS. 1a, 1b and 1c are somewhat schematic end elevation views illustrating edge preparations and welding sequences with conventional welding processes.
Figure 1B:
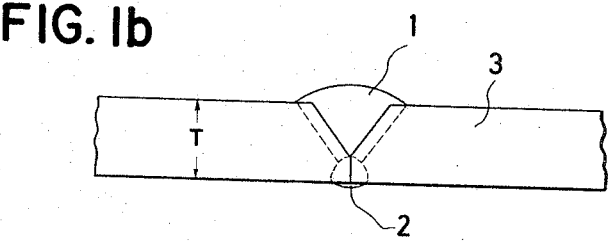
Figure 1C:
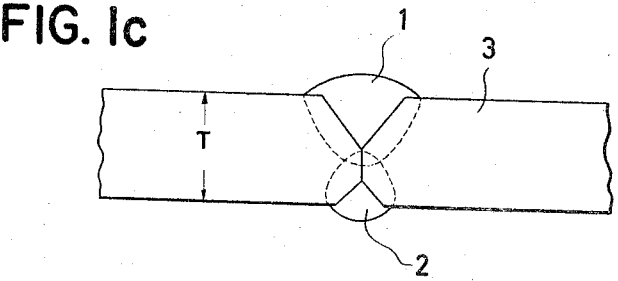

As shown in FIG. 1a, welding in the conventional process is performed using an I edge preparation without root opening, and the maximum plate thickness which can be welded is within 20 mm. even when back-chipping is employed. As the plate thickness increases, a Y-shaped edge as shown in FIG. 1b must be used. Even in this case, the maximum plate thickness weldable with the conventional process is only up to about 25 mm. As the plate thickness increases further, an X-shaped edge is generally used as shown in FIGS. 1a through 1c. In FIG. 1, 1 shows the backing weld, 2 is the finishing weld and 3 is the weldment.

As described above, it is impossible to weld a very thick plate with an I-edge by the conventional process, and a Y- or X-edge is needed for such purposes.

Moreover, in the conventional process, extreme accuracy of the edge alignment is needed to prevent molten metal from burning-through, and the root-opening tolerance must be smaller than 0.8 mm. For these reasons, machining of the edges is usually necessary.

Figure 2A:
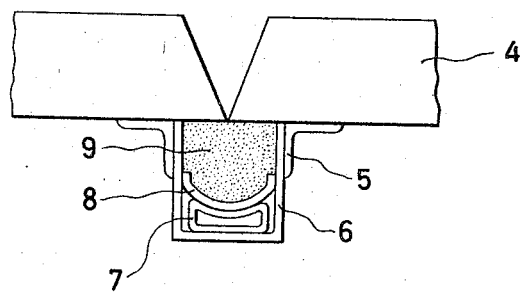
FIGS. 2a and 2b illustrate conventional weld backing arrangements.
Figure 2B:
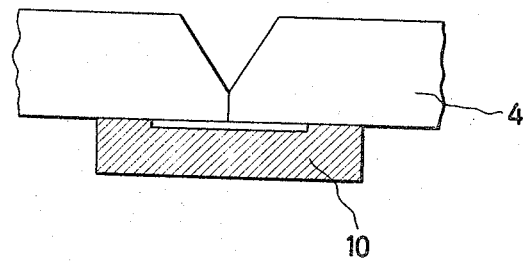

It is well known that, in conventional submerged arc welding, backing flux is disposed in contact with the bottom surfaces of the workpieces adjacent the abutting edges, such as shown in FIG. 2a. Alternatively, a copper backing plate 10 can be used, as illustrated in FIG. 2b. Both of these procedures are for the purpose of producing a root weld bead.

Figure 4:
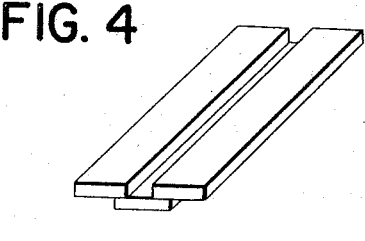
FIGS. 4a and 4b are, respectively, a perspective view and an end elevation view of one form of backing means used with the present invention as applied to a submerged arc welding procedure.
FIG. 4c is a perspective view of a spacer for presetting the width of the welding groove or gap with submerged arc welding employing the principles of the present invention.
FIG. 4d is a perspective view of a flux leveler.
FIG. 4e is a perspective view of the workpieces with the gauge of FIG. 4c inserted therebetween.
FIG. 4f is a perspective view of the workpieces arranged for welding with the flux being smoothed by the leveler shown in FIG. 4d.
FIG. 4g is a perspective view of the work just prior to the actual welding operation.

In FIGS. 2a and 2b 4 is the workpiece or weldment, 5 is an angle, 6 is a channel, 7 is a hose for pressing the flux, 8 is a refractory trough, 9 is backing flux and 10 is a copper backing plate.

Even with these processes, a V-shape groove is usually used in welding thick plate. In the welding of bevel edged steel plates, welding strain is produced to a considerable extent, and deformation after welding is considerable. Therefore, to prevent the weld metal from deformation after welding, it has been necessary to strictly restrain the workpieces before and during welding. Also, in the conventional process, when a high welding current is employed to increase welding efficiency and decrease the number of welding layers, the notch toughness of weld metal is considerably deteriorated. Furthermore, it has been ascertained that the weld metal is very sensitive to rust, oil and moisture, producing blow holes, pits and other defects. It is the primary object of the present invention to overcome the disadvantages of the conventional process as mentioned above. The present invention is characterized by using an I-shape edge and using flux-cored wires to fill up the accurately maintained rectangular gap or welding groove. Then welding is performed from one-side or both-sides. In the present invention, the flux-cored wire contains deoxidizing agents, alloying elements and basic slag-forming materials. Table 1 shows the typical components of a flux-cored wire for mild steel, and for 50 kg./mm.² and 60 kg./mm.² high tensile steels.

TABLE 1.—COMPONENTS OF FLUX IN FLUX-CORED WIRE

| Application | Flux ratio (wt. percent) | Component (wt. percent) | | | |
|---|---|---|---|---|---|
| | | Si-Mn | Fe-Mn | CaF₂ | Fe-Mo |
| For mild steel | 20 | 12 | 6 | 82 | |
| For 50 kg./mm.² high tensile steel | 22 | 14 | 6 | 74 | 6 |
| For 60 kg./mm.² high tensile steel | 22 | 16 | 8 | 64 | 12 |

The flux-cored wire of the present invention is manufactured in such a manner that powder, having the chemical analysis as shown in Table 1, is enclosed inside a thin metal sheath.

The details and advantages of the persent invention are described as follows. One of the advantages of the present invention is that welding can be performed with success using steel plate without any edge preparation or as gas-cut, that is, an I-edge can be used. The flux-cored wires are used to filled the groove up to the surface of the weldment in single or more than two columns, depending on the plate thickness. In the case of welding steel plate up to 15 mm. thickness, flux-cored wires of 4.0 mm. diameter are used in a single column in root opening of 5±1 mm.

When the thickness exceeds 15 mm., flux-cored wires are used to fill two columns in the groove, and then welding is performed using an electrode wire. The accuracy of the edge gap is 9±1 mm.

In the present invention, the density of metal in the edges is very small and the metal can be fused very easily due to the flux-cored wire in the groove. Therefore, the advantage of the conventional submerged arc welding process, that is, deep penetration, can be maintained as it is in the persent invention.

For this reason, it is possible to weld relatively thick plates from one-side or from both sides. Moreover, by using an I-shaped edge preparation, there is no difference of shrinkage between the upper and lower parts of steel plates in the course of solidification of molten metal, thus preventing shrinkage and deformation due to welding.

Further, the deoxidizer, alloying elements and basic slag-forming materials contained in the flux-cored wire make it possible to provide many advantages from the metallurgical point of view, which can not be expected with the conventional suberged arc welding process.

By adding the deoxidizer, total oxygen content and non-metallic inclusions in the weld metal are remarkably reduced by an adequate deoxidizing reaction of the molten metal during welding. Basic slag-forming materials produce a basic slag and promote the desulphurizing and dephosphorizing reactions, as well as the deoxidizing reaction, consequently producing weld metal which does not contain any impurities. By the refining reactions as mentioned above, the weld metal is considerably improved in notch toughness and resistance to rust, oil and moisture, and has no blow holes, pits, or any other defects.

Another advantage of the present invention is that alloying elements can be easily added into the weld metal from the flux-cored wire, rather than from an electrode wire as in the case of a conventional process, and cheap mild steel electrode wire can be used, consequently being very economical. At the same time, the amount of alloying element can be easily adjusted by the flux contained in the core of the wire, to obtain a desired weld metal analysis.

Examples of the present invention, as applied to a submerged arc welding, will now be explained in detail.

Figure 3A:
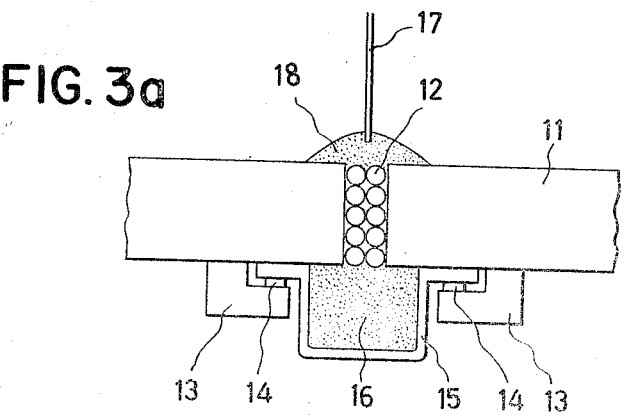
FIGS. 3a and 3b illustrate one-side welding procedures utilizing the present invention.
Figure 3B:
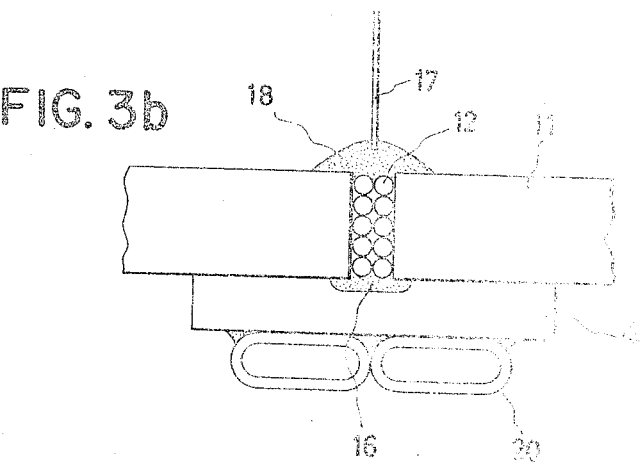

Referring first to the one-side welding process, as shown in FIG. 3a the flux-cored wire 12 is inserted into the gap between I-shape edges of the weldments 11, a backing member 15 for backing flux is positioned using strong-backs 13 and a wedge 14, and backing flux 16 is poured into member 15. Then, one-pass welding is performed using an electrode wire 17 from one side under the shielding of welding flux 18, producing a beautiful root weld bead. FIG. 3b shows a process which is almost the same as mentioned above, but using a copper-backing strip 19, filled with a flux 16 and water-cooled by means of a copper cooling pipe 20.

As illustrated in FIG. 3b, a copper backing strip 19, without a filling of backing flux, can also be used successfully.

Figure 4E:
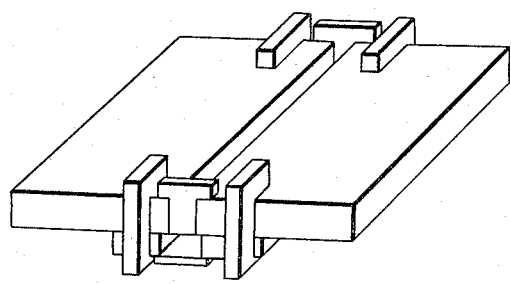
Figure 4A:
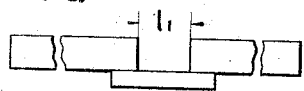

FIGS. 4a–1 through g illustrate the sequence of preparations before the actual welding. Referring to these figures, a flux backing member can be formed of copper plate, such as shown in FIGS. 4a–1 and 4a–2. In FIGS. 4a–2, $l_1$ illustrates the width of the groove in the backing plate, which groove is filled with the backing flux.

Figure 4B:
Figure 4F:
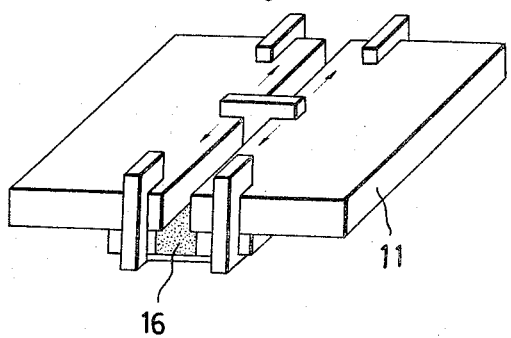
Figure 4C:
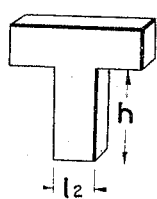
Figure 4G:
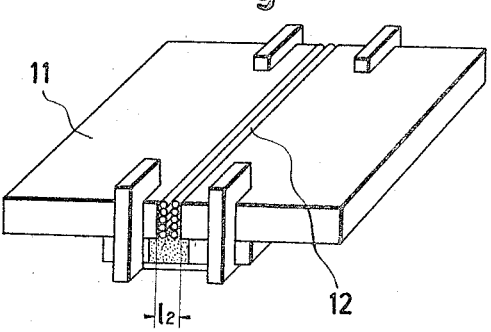
Figure 4D:
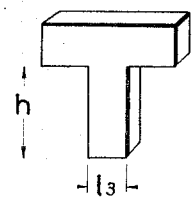

A jig for holding a backing flux can be of light weight material such as aluminum, thick paper and so on as shown in FIG. 4b. Next, as shown in FIG. 4e, the steel plates are restrained using the welding spacer illustrated in FIG. 4c in which $l_2$ is equal to the desired spacing of the workpiece edges and $h$ is equal to the thickness of the workpiece. Backing flux then is poured into the gap between the edges, from the upper side, and the amount of flux is adjusted using the flux-adjusting leveler of FIG. 4d in which $l_3$ is slightly smaller than $l_2$. The flux is made flat so that the upper surface of the flux is at the same height as the bottom surfaces of the workpiece 11, as shown in FIG. 4f. After that, the flux-cored wire 12 is positioned in the welding groove up to the level of the upper surfaces of the workpieces 11. The preparation before welding is now finished, as illustrated in FIG. 4g.

In order to obtain an excellent root weld bead, physical properties of slag, such as surface tension, viscosity and expansion coefficient after melting play an important role, so it is desirable to use materials which have a melting point lower than that of iron. In the case of welding very thick plate, which cannot be welded from one side only, welding from both sides is needed.

The application of the principles of the present invention to welding from both sides of the workpieces is illustrated in FIGS. 5a through 5d. Referring to these figures, the flux-cored wire 12 is positioned to fill the gap or welding groove between the I-shape edges of the weldments 11 and manual tack welding 21 is effected between the core-wire 12 and the base plates 11. Then, welding is performed using an electrodes wire 17 and flux 18. In this case, the welding conditions are adjusted so that the penetration of one side weld bead 22 equals nearly a half of the plate thickness, and some of the cored wires 12 remain unfused. The remaining flux-cored wires in the groove contact each other electrically and are melted with the base plate. The unfused flux-cored wires are clamped tightly because of the shrinkage of weld bead 22.

Figure 5A:
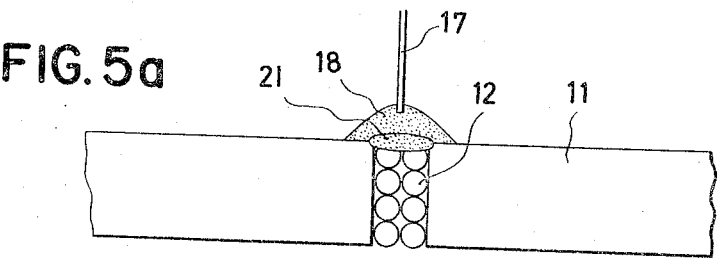
FIGS. 5a through 5d are end elevation views illustrating successive steps in two-side welding of steel plates utilizing the present invention with a submerged arc welding procedure.
Figure 5B:
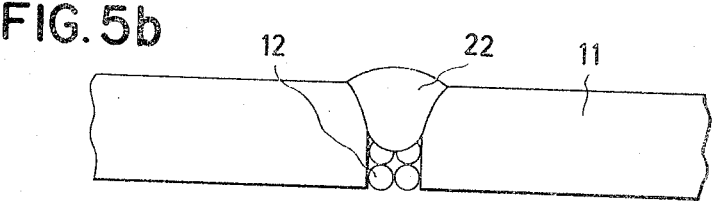
Figure 5C:
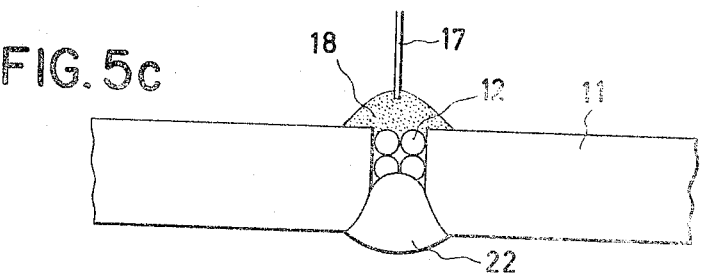
Figure 5D:
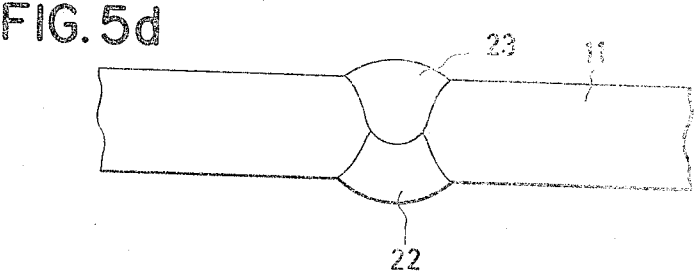

As shown in FIG. 5c, reverse side welding is then performed on the unfused zone by turning over the steel plates and using an electrode wire 17 and flux 18. FIG. 5d illustrates a cross-section of the weld bead made from both sides. Welding is completed by backing 22 and finishing passes 23.

Some examples of the present invention will be explained.

TABLE 3.—THICKNESS, CHEMICAL COMPOSITION AND MECHANICAL PROPERTIES OF STEEL PLATE USED

| Steel plate | Plate thickness (mm.) | Chemical composition (wt. percent) | | | | | Mechanical properties | | | |
|---|---|---|---|---|---|---|---|---|---|---|
| | | C | Si | Mn | P | S | Y.P. (kg./mm.$^2$) | T.S. (kg./mm.$^2$) | E (percent) | VEo (kg.-m.) |
| A | 8 | 0.15 | 0.01 | 0.54 | 0.016 | 0.018 | 30 | 44 | 41 | |
| B | 12 | 0.19 | 0.05 | 0.68 | 0.014 | 0.024 | 27 | 45 | 21 | |
| C | 15 | 0.17 | 0.06 | 0.96 | 0.012 | 0.018 | 31 | 47 | 32 | 12.0 |
| D | 20 | 0.19 | 0.05 | 0.68 | 0.012 | 0.024 | 27 | 45 | 31 | |
| E | 25 | 0.16 | 0.15 | 0.74 | 0.012 | 0.013 | 29 | 45 | 29 | 7.8 |
| F | 32 | 0.14 | 0.21 | 0.74 | 0.012 | 0.003 | 30.3 | 44.2 | 32 | 26.8 |

With respect to a one-side one-pass welding procedure, Table 3 shows the plate thickness, chemical composition and mechanical properties of the steel plate used. Details of the electrode wire and flux are listed in Table 2(1) and 2(2). The chemical analysis of backing flux used is listed in Table 4 (below).

TABLE 4.—CHEMICAL ANALYSIS OF BACKING FLUX

| Grain size (mesh) | Chemical composition (wt. %) | | | | | | |
|---|---|---|---|---|---|---|---|
| | SiO$_2$ | MnO | FeO | Al$_2$O$_3$ | CaO | MgO | TiO$_2$ |
| 12 x 150 | 38.0 | 47.0 | 0.7 | 15.0 | 0.2 | 1.2 | |

*Example 1*

In the case of submerged arc welding of plain mild steel plate, the flux-cored wire as shown in Table 1 and the electrode wire as shown in Table 2(1) and 2(2) below were sued.

The steel plates used are chiefly mild steel including F grade steel for ship building of a thickness ranging from 8 to 32 mm.

Table 5 shows the results of application of the one-side welding procedure to steel plates of various thickness.

TABLE 5.—TEST RESULTS OF APPLICATION OF ONE-SIDE ONE-PASS WELDING PROCEDURE TO VARIOUS THICKNESS OF PLATE

| Plate thickness (mm.) | Welding condition | | | | Chemical composition of weld metal (percent) | | | | |
|---|---|---|---|---|---|---|---|---|---|
| | Number of flux-cored wire | Welding current (A) | Voltage (V) | Welding speed (cm./min.) | C | Si | Mn | P | S |
| A(8) | 2 | 600 | 34 | 28 | 0.10 | 0.17 | 0.96 | 0.016 | 0.025 |
| B(12) | 3 | 800 | 34 | 28 | 0.12 | 0.12 | 0.86 | 0.015 | 0.025 |
| C(15) | 4 | 900 | 34 | 28 | 0.11 | 0.13 | 1.04 | 0.012 | 0.021 |
| D(20) | 10 | 1,050 | 34 | 24 | 0.09 | 0.19 | 1.07 | 0.020 | 0.020 |
| E(25) | 12 | 1,200 | 35 | 20 | 0.09 | 0.22 | 0.98 | 0.017 | 0.017 |
| F(32) | 16 | 1,400 | 38 | 20 | 0.08 | 0.24 | 0.95 | 0.012 | 0.012 |

| Plate thickness (mm.) | Mechanical properties | | | Bending test | | |
|---|---|---|---|---|---|---|
| | Y.P. (kg./mm.$^2$) | T.S. (kg./mm.$^2$) | Impact value VEo (kg.-m.) | Face Bending | Root Bending | Side Bending |
| A(8) | 23.3 | 49.6 | | Good | Good | |
| B(12) | 30.0 | 50.3 | 3.7 | do | do | |
| C(15) | 32.5 | 50.3 | 7.0 | do | do | |
| D(20) | 33.0 | 47.2 | 11.3 | do | do | Good. |
| E(25) | 34.1 | 46.9 | 8.7 | do | do | Do. |
| F(32) | 34.2 | 46.1 | 8.6 | do | do | Do. |

Figure 14:
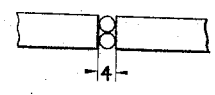
Figure 14:
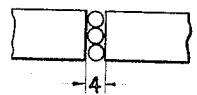
Figure 14:
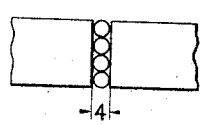
Figure 14:
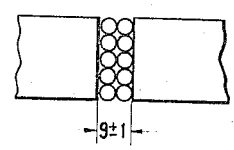
Figure 14:
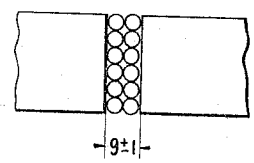
Figure 14:
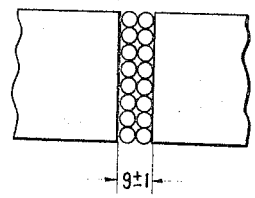

NOTE: Edge forms for the plates A, B, C, D, E and F in the above table are shown in FIGS. 14a–14b.

TABLE 2(1).—CHEMICAL COMPOSITION OF ELECTRODE WIRE USED

| Dia. of electrode wire (mm.) | Chemical analysis (wt. percent) | | | | | | |
|---|---|---|---|---|---|---|---|
| | C | Si | Mn | P | S | Cu | Fe |
| 4.8<br>6.4 | 0.07 | 0.010 | 0.35 | 0.015 | 0.015 | 0.15 | Balance |

TABLE 2(2).—CHEMICAL ANALYSIS OF FLUX USED

| Grain size (mesh) | Chemical composition (wt. percent) | | | | | | |
|---|---|---|---|---|---|---|---|
| | SiO$_2$ | MnO | FeO | Al$_2$O$_3$ | CaO | MgO | TiO$_2$ |
| 20 x Dust | 44.40 | 8.15 | 0.73 | 1.48 | 24.01 | 6.48 | 0.41 |

As evident from the results, the mechanical properties of the weld metal are satisfactory, giving excellent 2V notch charpy impact properties.

Figure 6A:
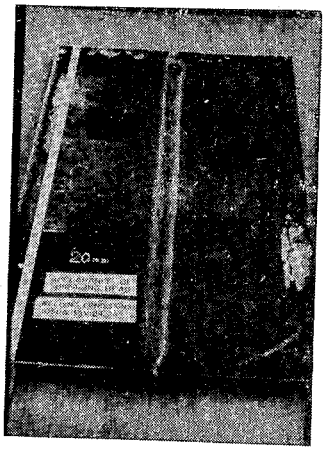
FIGS. 6a through 10b are a series of photographs illustrating results attained with the present invention.
Figure 6B:
Figure 7A:
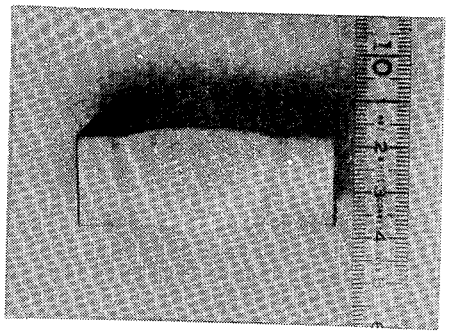
Figure 7B:
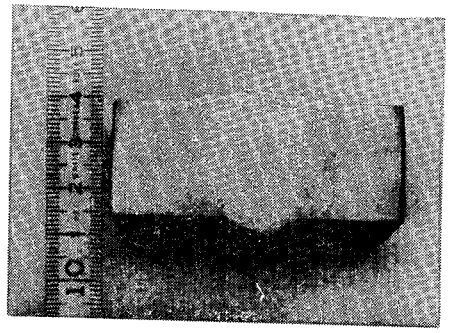
Figure 7C:
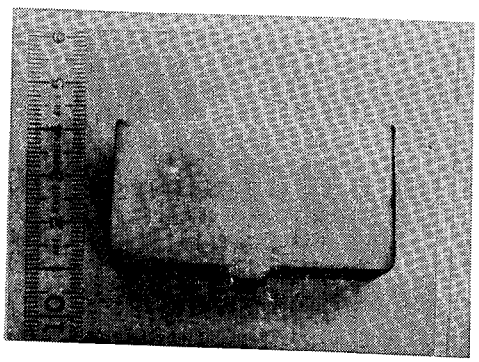
Figure 8A:
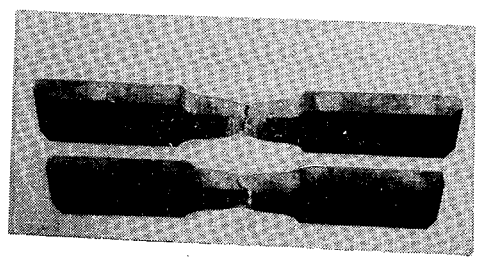
Figure 8B:
Figure 8C:
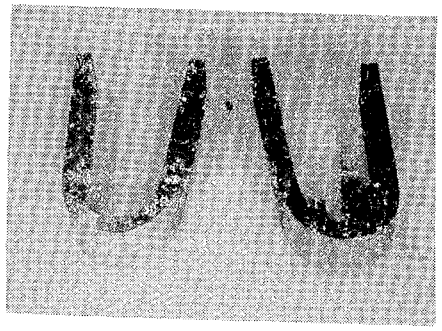

The photographs of FIGS. 6a and 6b show the appearance of a weld joint between steel plates D (plate thickness is 20 mm.), made from one-side. FIG. 6a shows the surface bead and FIG. 6b shows the root weld bead. It is clear from these photographs that an excellent root bead can be obtained. The photographs of FIGS. 7a–7e illustrate macrographs of the cross-section of weld joints made from one-side. FIG. 7a shows a weld between steel plates D (plate thickness is 20 mm.), FIG. 7b shows that between steel plates E (thickness is 25 mm.), and FIG. 7c shows that between steel plates F (thickness is 32 mm.), all of which exhibit a complete and excellent root bead of the specimens. The photographs of FIGS. 8a–8c show test results on welded joints made from one-side only and using the steel plates E (thickness is 25 mm.). FIG. 8a shows the results of the short guage length tension test, FIG. 8b shows the results of the free bending test and FIG. 8c shows the results of the side bending test. Bending angle of the root bead free bending test and of the side bending test is 180° with no defects, giving 100% weld joint efficiency.

Single pass welding from both sides is effected as will now be described.

Mild steel plate as shown in Table 6, an electrode wire (6.4 mm.) as shown in Table 2(1) and flux as listed in Table 2(2) were used.

The test results are shown in Table 7 (below).

As evident in Table 7, the chemical composition of the weld metal, especially the carbon and silicon contents, are lowered by the promoted deoxidizing reaction, giving an excellent absorbed energy at 0° C. In the tension test of the welded joint, the specimen breaks in the base plate, giving 100% weld joint efficiency.

Figure 9:

FIG. 9 is a macrograph of the cross-section of a welded joint between steel plates G (thickness is 38 mm.), made from both sides.

*Example 2*

In the case of $CO_2$ arc welding of a plain mild steel plate according to the present invention, the same flux-cored wire, for mild steel, as used in Example 1 was used. Chemical analysis of the electrode wire used is as follows.

Table 9 (below) illustrates the plate thickness and chemical composition of the steel plate used.

Table 10 (below) exhibits the results of the application of the $CO_2$ arc welding process to various thickness steel plates. In Table 10, steel plates I–L are welded from one-side only and steel plates M are welded from both sides.

TABLE 6.—THICKNESS, CHEMICAL COMPOSITION AND MECHANICAL PROPERTIES OF STEEL PLATE USED

| Steel plate | Plate thickness (mm.) | Chemical composition (wt. percent) | | | | | Mechanical properties | | | |
|---|---|---|---|---|---|---|---|---|---|---|
| | | C | Si | Mn | P | S | Y.P. (kg./mm.$^2$) | T.S. (kg./mm.$^2$) | E (percent) | VEo (kg.-m.) |
| G | 38 | 0.15 | 0.11 | 0.72 | 0.011 | 0.016 | 31 | 48 | 30 | 7.5 |
| H | 45 | 0.17 | 0.12 | 0.85 | 0.012 | 0.010 | 38 | 43 | 29 | 7.0 |

TABLE 7.—TEST RESULTS OF APPLICATION OF ONE-PASS WELDING FROM BOTH SIDES TO VARIOUS THICKNESS PLATE

| Steel plate (mm.) | Welding conditions | | | | | | | Chemical composition of weld metal (percent) | | | | |
|---|---|---|---|---|---|---|---|---|---|---|---|---|
| | Number of flux-cored wire | Backing | | | Finishing | | | C | Si | Mn | P | S |
| | | A | V | Welding speed (cm./min.) | A | V | Welding speed (cm./min.) | | | | | |
| G(38) | 18 | 1,050 | 38 | 24 | 1,050 | 40 | 25 | 0.08 | 0.20 | 0.97 | 0.016 | 0.015 |
| H(45) | 22 | 1,200 | 38 | 24 | 1,200 | 40 | 22 | 0.08 | 0.18 | 0.96 | 0.012 | 0.013 |

| Steel plate (mm.) | Mechanical properties | | | Bending test | | |
|---|---|---|---|---|---|---|
| | Y.P. (kg./mm.$^2$) | T.S. (kg./mm.$^2$) | VEo (kg.-m.) | Face bending | Root Bending | Side Bending |
| G(38) | 32.5 | 46.2 | 14.5 | Good | Good | Good. |
| H(45) | 31.0 | 45.8 | 10.5 | do | do | Do. |

Figure 15:
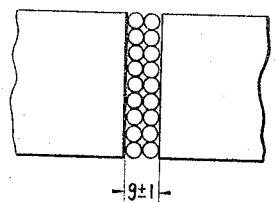
Figure 15:
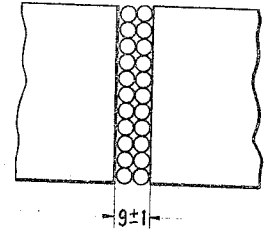

NOTE: Edge forms for the plates G and H are shown in Figs. 15

TABLE 8.—CHEMICAL ANALYSIS OF ELECTRODE WIRE USED

| Dia. of electrode wire (mm.) | Chemical composition (wt. percent) | | | | | | | |
|---|---|---|---|---|---|---|---|---|
| | C | Si | Mn | P | S | Cu | Al | Ti |
| 2.0 | 0.079 | 0.74 | 1.72 | 0.010 | 0.012 | 0.50 | 0.069 | 0.280 |

TABLE 9.—CHEMICAL COMPOSITION OF STEEL PLATE USED

| Steel plate | Chemical composition (wt. percent) | | | | |
|---|---|---|---|---|---|
| | C | Si | Mn | P | S |
| I | 0.147 | 0.230 | 0.55 | 0.010 | 0.005 |
| J | 0.183 | 0.075 | 0.73 | 0.011 | 0.023 |
| K | 0.167 | 0.083 | 1.11 | 0.010 | 0.031 |
| L | 0.195 | 0.050 | 0.80 | 0.015 | 0.030 |
| M | 0.140 | 0.210 | 0.74 | 0.012 | 0.003 |

TABLE 10.—TEST RESULTS OF APPLICATION OF SAID $CO_2$ ARC WELDING PROCESS TO VARIOUS THICKNESS STEEL PLATE

| Steel plate (mm.) | Welding conditions | | | | | Chemical composition of weld metal (percent) | | | | |
|---|---|---|---|---|---|---|---|---|---|---|
| | Number of flux-cored wire | A | V | Speed (cm./min.) | Shielding gas (l./min.) | C | Si | Mn | P | S |
| I(13) | 3 | 500 | 35 | 20 | $CO_2$, 25; $O_2$, 8 | 0.10 | 0.17 | 0.90 | 0.015 | 0.024 |
| J(15) | 4 | 530 | 35 | 17 | $CO_2$, 25; $O_2$, 8 | 0.12 | 0.20 | 0.80 | 0.008 | 0.020 |
| K(20) | 10 | 620 | 41 | 15 | $CO_2$, 25; $O_2$, 8 | 0.09 | 0.21 | 0.95 | 0.017 | 0.010 |
| L(25) | 12 | 640 | 41 | 13 | $CO_2$, 25; $O_2$, 8 | 0.11 | 0.18 | 0.85 | 0.009 | 0.011 |
| M(32) | 16 | ¹640 | 41 | 15 | $CO_2$, 25; $O_2$, 8 | 0.08 | 0.18 | 0.79 | 0.012 | 0.018 |
| | | ²640 | 41 | 15 | | | | | | |

| Steel plate (mm.) | Mechanical properties | | | Bending test | | |
|---|---|---|---|---|---|---|
| | Y.P. (kg./mm.²) | T.S. (kg./mm.²) | VEo (kg.-m.) | Face bending | Root bending | Side bending |
| I(13) | 29.0 | 48.2 | 5.1 | Good | Good | Good. |
| J(15) | 32.0 | 50.4 | 5.0 | do | do | Do. |
| K(20) | 34.5 | 49.4 | 6.2 | do | do | Do. |
| L(25) | 33.5 | 52.7 | 6.5 | do | do | |
| M(32) | 34.3 | 49.7 | 6.7 | do | do | |

¹ Backing Pass.   ² Finishing Pass.

Figure 16:
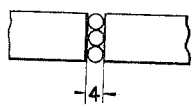
Figure 16:
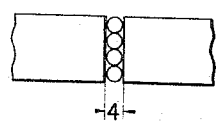
Figure 16:
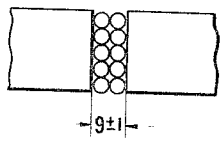
Figure 16:
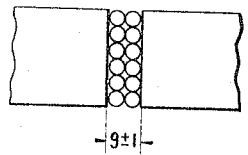
Figure 16:
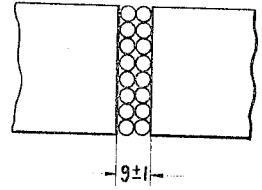

NOTE: Edge forms for the plates I, J, K, L and M are shown in Fig. 16.

Up to the present, the $CO_2$ arc welding process has been used mainly for welding of sheet plate but, as evident in Table 10, it is possible to weld thick plate up to 25 mm. from one-side only, in accordance with using 2.0 mm. dia. electrode wire by the present invention. For heavier plates (for example steel plate M in Table 10), welding efficiency can be considerably increased by welding from both sides.

Figure 10A:
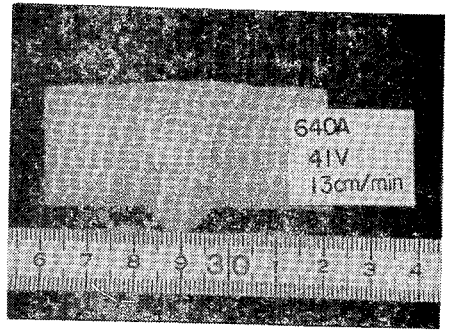
Figure 10B:
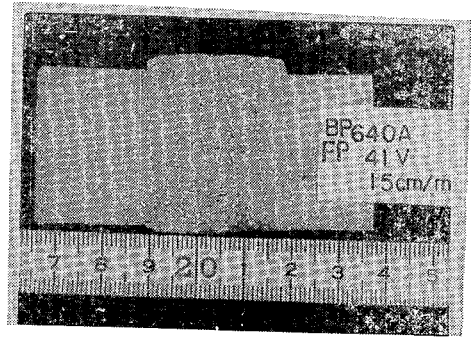

In the present invention, especially as applied in the $CO_2$ arc welding process, flux contained in the cored-wire is melted and becomes a slag covering the molten pool. Accordingly, the arc stability is excellent with little spatter. Also, welding with high welding currents is performed with ease. There is no problem with respect to the properties of the welded joint as shown in Table 10. The photographs of FIGS. 10a and 10b illustrate macrographs of welded joints made with the $CO_2$ arc welding process. FIG. 10(a) illustrates a welded joint between steel plates K (plate thickness is 20 mm.), and FIG. 10-(b) illustrates a welded joint between steel plates M (plate thickness is 32 mm.).

The flux-cored wires used in the present invention have important metallurgical effects on the welding. These metallurgical effects, when using the submerged arc welding procedure, are illustrated graphically in FIG. 11. FIG. 11 shows the effect of the number of flux-cored wires on chemical composition and absorbed energy of weld metal under the welding conditions as set forth in Table 11. As the number of the flux-cored wires in the groove increases, the manganese and silicon contents of the weld metal increase, the oxygen and carbon contents decrease, and the absorbed energy of the charpy impact test is also raised.

TABLE 11.—WELDING CONDITIONS

| Diameter of wire (mm.) | Welding current (A) | Arc voltage (V) | Welding speed (cm./min.) |
|---|---|---|---|
| 4.8 | 900 | 38-40 | 20 |

Flux-cored wire: 4.0 mm. diameter
Flux (20 x D).

When the number of the flux-cored wires is approximately more than 6, that is, the weight ratio of the cored-wire to the weld metal is more than 33.3%, the oxygen content of the weld metal is lowered, and it has been ascertained that the absorbed energy at 0° C. shows an excellent impact value of more than 8 kg.-m. Further, as the groove area increases, the number of the flux-cored wires filled into the groove increases. At the same time, welding heat input is increased. In FIG. 12 is illustrated the effect of the groove area on chemical composition and the absorbed energy of weld metal. Judging from this figure, no change in chemical composition of weld metal was observed, and an excellent absorbed energy of more than 8 kg.-m. at 0° C. was obtained.

Following is an explanation of the metallurgical effects of the present invention for the $CO_2$ arc welding process. FIG. 13 illustrates the effect of the number of flux-cored wires on the impact value and chemical composition of weld metal under the welding conditions as set forth in Table 12, showing the same tendency as in the case of the submerged arc welding process as shown in FIG. 11. As a result, it is evident that the absorbed energy at 0° C. is remarkably improved on account of the metallurgical effect of the flux-cored wire.

TABLE 12.—WELDING CONDITIONS

| Diameter of wire (mm.) | Welding current (A) | Arc voltage (V) | Welding speed (cm./min.) | Shielding gas (l./min.) |
|---|---|---|---|---|
| 2.0 | 550 | 36 | 17 | $CO_2$, 25; $O_2$, 8 |

Flux-cored wire: 4.0 mm. diameter

Various advantages of the present invention may be summarized as follows:

(1) The edge preparation of steel plate is the simplest shape; I edge or gas-cut plate may be used for welding. Therefore, an accuracy of edge preparation obtainable only by machining is not required.

(2) Welding efficiency is remarkably increased and the number of welding layers is decreased accordingly, very thick plates can be welded from one side only by using the specially made backing flux or water-cooled copper backing plate, producing an excellent root weld bead with ease.

(3) By adding an adequate amount of deoxidizing agents, basic slag-forming materials and alloying elements inside the flux-cored wire, deoxidizing and refining reactions are promoted completely, thus resulting in an improved notch toughness of the weld metal as well as a low sensitivity to rust, oil and moisture, and producing no blow holes, pits and other defects.

(4) Welding strain is very small due to the edge preparation being I-shape.

As shown above, the present invention has many ad-

What is claimed is:

1. A method of weld-uniting facing edges of metal workpieces, using the fusible metal arc welding process, comprising the steps of providing the workpieces with planar edges to be weld united, the planar edges being substantially normal to the surfaces of the workpieces; positioning the workpieces with planar facing edges in spaced substantially parallel relation to form a substantially rectangular cross section welding groove opening through both of the opposite surfaces of the workpieces; substantially filling the groove with flux-cored, metal-sheathed rods in substantially parallel relation and extending longitudinally of the welding groove, the cores of said rods including a deoxidizing agent, alloying material and basic slag-forming material; and electrically weld uniting the workpieces by an arc welding current flowing between a fusible metal wire as one electrode and the workpieces as the other electrode.

2. A method of weld uniting facing edges of metal workpieces, as claimed in claim 1, in which said rods are disposed in said groove in a single column.

3. A method of weld uniting facing edges of metal workpieces, as claimed in claim 1, in which said rods are disposed in said groove in plural columns.

2. A method of weld uniting facing edges of metal workpieces, as claimed in claim 1, in which said rods fill said groove to the height of the upper surfaces of said workpieces.

5. A method of weld uniting facing edges of metal workpieces, as claimed in claim 1, including the step of positioning a backing plate, filled with a backing flux, against the lower surfaces of the workpieces and extending across said groove, the welding being performed in a single pass from the opposite surfaces of said workpieces.

6. A method of weld uniting facing edges of metal workpieces, as claimed in claim 1, including the step of positioning only a backing plate in contact with the lower surfaces of the workpieces and extending across said welding groove, the welding being performed in a single pass from the upper surfaces of said workpieces.

7. A method of weld uniting facing edges of metal workpieces, as claimed in claim 1, in which the welding is performed in two single passes, one from each surface of said workpieces, the workpieces being inverted between said two single passes.

8. A method of weld uniting facing edges of metal workpieces, as claimed in claim 7, in which said two single passes include a backing pass and a finishing pass, the depth of penetration of said backing pass being nearly one half the depth of said welding groove.

References Cited by the Examiner

UNITED STATES PATENTS

| | | | |
|---|---|---|---|
| 1,323,556 | 12/1919 | Smith | 219—160 |
| 1,771,961 | 7/1930 | Ipsen | 219—137 |
| 2,135,009 | 1/1939 | Keir | 219—73 |
| 2,330,289 | 9/1943 | Keir | 219—76 |
| 3,153,719 | 10/1964 | Arikawa et al. | 219—73 |

RICHARD M. WOOD, *Primary Examiner.*